No. 693,954. Patented Feb. 25, 1902.
C. M. DAY.
CLUTCH MECHANISM.
(Application filed Oct. 7, 1901.)
(No Model.)
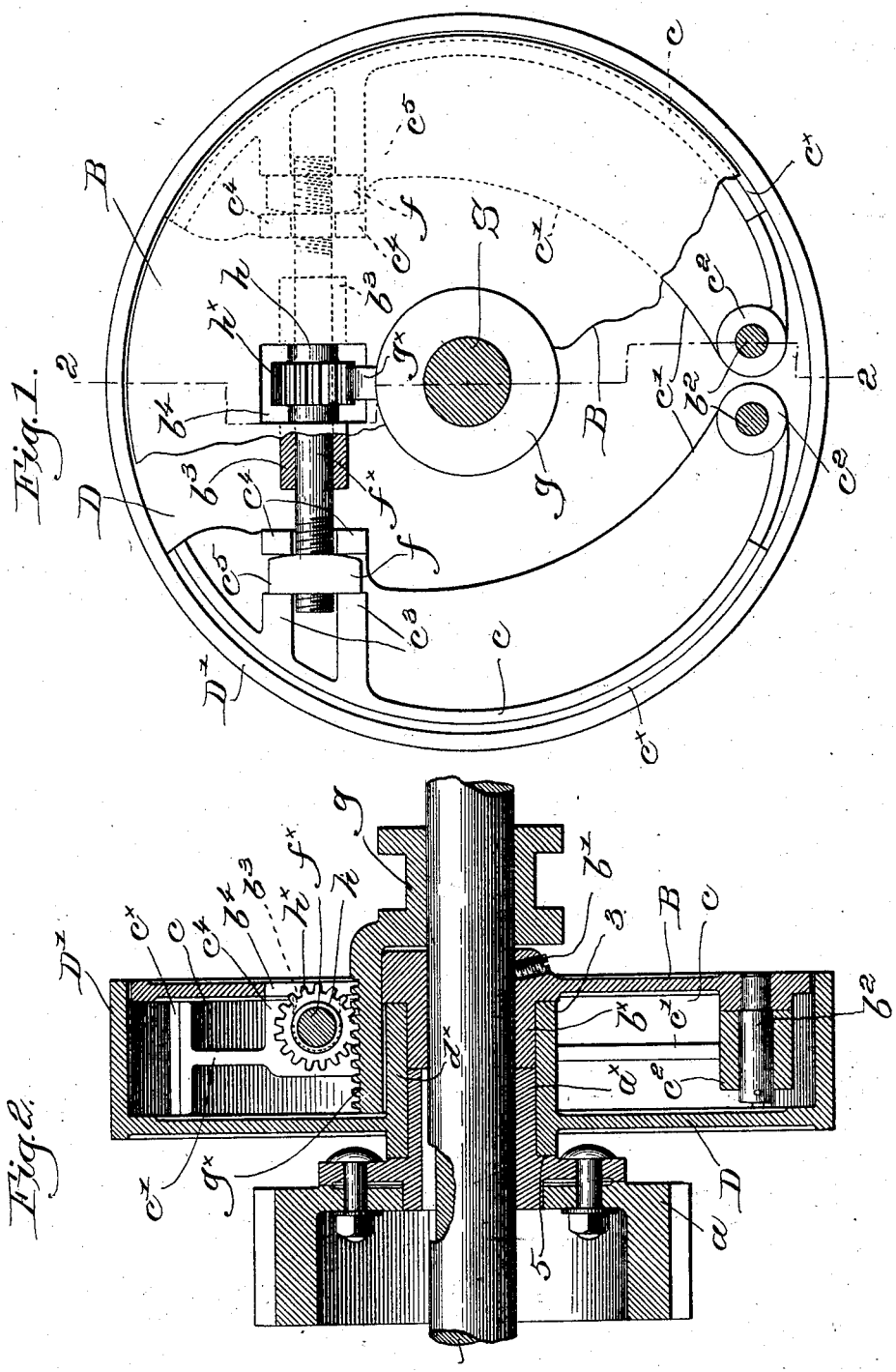
Witnesses:
Thomas F. Drummond
Edward H. Allen
Inventor.
Charles M. Day,
by Crosby & Gregory
attys

UNITED STATES PATENT OFFICE.

CHARLES M. DAY, OF HOPEDALE, MASSACHUSETTS, ASSIGNOR TO DRAPER COMPANY, OF HOPEDALE, MASSACHUSETTS, A CORPORATION OF MAINE.

CLUTCH MECHANISM.

SPECIFICATION forming part of Letters Patent No. 693,954, dated February 25, 1902.

Application filed October 7, 1901. Serial No. 77,833. (No model.)

*To all whom it may concern:*

Be it known that I, CHARLES M. DAY, a citizen of the United States, residing at Hopedale, in the county of Worcester and State of Massachusetts, have invented an Improvement in Clutch Mechanism, of which the following description, in connection with the accompanying drawings, is a specification, like characters on the drawings representing like parts.

This invention has for its object the production of a simple, powerful, and direct-acting clutch mechanism whereby the driving and driven members may be readily and effectively clutched and unclutched, the various novel features of the invention being hereinafter described, and particularly pointed out in the following claims.

Figure 1 is a front elevation, partly broken out, of a clutch mechanism embodying one form of the invention; and Fig. 2 is a section thereof on the irregular line 2 2, Fig. 1, looking toward the right.

The clutch mechanism is herein shown in connection with a shaft S, to be rotated when the clutch is operative, a gear $a$ being shown in Fig. 2 as having an elongated hub $a^\times$ keyed to the shaft to rotate therewith. The driven member of the clutch is herein shown as a disk B, having its hub $b^\times$ secured to the shaft, as by a screw 3, Fig. 2. The inner end of the hub, which latter is shouldered at $b'$, is shown butted against the end of the hub $a^\times$, said hubs having the same external diameter. The driving member is herein shown as a disk D, having a long hub $d^\times$, which surrounds and is rotatably mounted on the hubs $a^\times$ $b^\times$, longitudinal movement of said member D being prevented by the shoulders 5 and 3 of said hubs, as shown in Fig. 2, the driving member having an annular flange D', which surrounds the periphery of the disk or driven member B, leaving a slight clearance. The clutch members thus form a substantially closed circular box, which incloses the means for clutching and releasing said members, the flange D' serving as a pulley-face to receive a belt (not shown) operated from any suitable source of power to effect rotation of the driving member.

The clutching means comprises two pivotally-supported segments $c$ $c$, disposed on opposite sides of the shaft S and each being strengthened by a transverse web C', cast therewith, and preferably the convex face of each segment is provided with a friction pad or shoe $c^\times$, of leather or other suitable material, said shoes being adapted, when desired, to engage symmetrically opposite portions of the inner face of the flange D', the major portion of such face being engaged when the driving and driven members are clutched together. Two parallel studs $b^2$ are secured to the driven member near its periphery and project toward the driving member, (see Fig. 2,) and upon said studs are mounted hubs $c^2$ on the adjacent ends of the segments, as clearly shown in the drawings, so that said segments are fulcrumed on the studs and are movable toward and from each other. Near their other and opposite free ends the segment-webs $c'$ are shown in Fig. 1 as each provided with two notched ears or lugs $c^3$ $c^4$ on the web-face nearest the disk B, the space $c^5$ between each pair of ears constituting a seat to receive loosely a nut-like bearing $f$, and into these bearings are screwed the oppositely-threaded ends of a rotatable shaft or actuator $f^\times$. Said actuator is extended through and rotatably supported by bearing-lugs $b^3$ on the inner face of the member B at each side of a hole $b^4$ therein, the hub $h$ of a pinion $h^\times$, fast on the actuator, being inserted between the lugs, as clearly shown in Fig. 1. The actuator subtends the chord of an arc of the flange D' on the side of the shaft S opposite the fulcrum-studs $b^2$, and manifestly rotation of said actuator in one or the other direction will operate to separate or draw together the friction-segments, the loose seating of the bearing-nuts permitting them to move sufficiently relatively to the segments to permit such movement without cramping the actuator, the ends of which are shown in Fig. 1 as loosely entering the notched ears $c^3$ $c^4$ on each segment-web. This construction is very strong and cheap to manufacture, as the segments can be readily cast with their webs and the notched ears thereon and the bearings $f$ slipped into their seats when the parts are assembled.

The segments and actuator are inclosed within the clutch members, and thereby protected from dust and dirt, and they cannot catch upon any object exterior to the clutch.

An annularly-grooved collar $g$ is loosely mounted on the shaft outside and adjacent the member B, having a rack $g^\times$ extended therefrom through the hole $b^4$ and meshing with the pinion $h^\times$, so that sliding movement of the collar on the shaft, as by a yoke of usual construction and not shown, will operate to rotate the actuator $f^\times$ to separate or draw together the friction-segments. In the former case they are pressed firmly into frictional engagement with the flange D', so that the rotation of the driving member D is transmitted to the driven member B to the shaft to rotate the latter. When the actuator is oppositely rotated, the segments will be swung toward each other about their fulcra $b^2$ and the driving and driven members will be instantly unclutched.

Owing to the threading of the actuator, it will have no tendency to turn in either direction in its bearings $f$ and practically serves to automatically lock the segments in any desired position until changed by a positive sliding movement of the collar $g$.

Various changes or modifications may be made in the construction and arrangement herein shown and described without departing from the spirit and scope of the invention.

Having fully described my invention, what I claim as new, and desire to secure by Letters Patent, is—

1. In apparatus of the class described, a driving member having an annular flange, a disk-like member to be driven, peripherally inclosed by the flange, opposed friction-segments fulcrumed on the disk-like member, to engage symmetrically opposite portions of the inner face of said flange, a rotatable actuator mounted at its center directly on the disk and having oppositely-threaded ends, rocking or tipping bearings mounted on the segments and threaded to receive the ends of the actuator, to separate or draw the segments together when the actuator is rotated in one or the other direction, and means to effect rotative movement of the actuator, to thereby clutch or unclutch said driving and driven members.

2. In apparatus of the class described, a rotatable shaft, a driving member loose thereon having an annular flange, a disk-like member to be driven, fast on the shaft, opposed friction-segments pivotally mounted thereon and inclosed by the annular flange, a rotatable actuator mounted directly on the disk substantially diametrically opposite the pivoted ends of the segments, and having oppositely-threaded ends operatively connected with the free ends of the segments, to separate or draw the same toward each other, rocking or tipping connections between the actuator and segments, and means mounted on the shaft to engage and effect the rotative movement of the controller.

3. In apparatus of the class described, a rotatable shaft, a driving member loose thereon having an annular flange, a member to be driven, fast on the shaft, oppositely-movable friction-segments fulcrumed on the driven member and adapted to coöperate with the flange of the driving member, a rotatable actuator having oppositely-threaded ends mounted directly on the driven member between the free ends of the segments, threaded bearings for said actuator, loosely seated on the segments, rotation of the actuator separating or drawing the said segments together, means to prevent movement of the bearings on the segments in the direction of the length of the actuator and to permit said bearings to tip or rock, and a controller mounted loosely on and movable longitudinally upon the shaft to rotate said actuator, the coöperation of the actuator with its threaded bearings acting to lock the segments in position until the actuator is positively rotated by or through the controller.

In testimony whereof I have signed my name to this specification in the presence of two subscribing witnesses.

CHARLES M. DAY.

Witnesses:
GEORGE OTIS DRAPER,
ERNEST W. WOOD.